United States Patent
Moore (10) Patent No.: US 10,768,627 B2
(45) Date of Patent: Sep. 8, 2020

(54) AUTONOMOUSLY MOVEABLE STORAGE UNITS AND WHEELCHAIR STORAGE SYSTEMS

(71) Applicant: Toyota Motor North America, Inc., Plano, TX (US)

(72) Inventor: Douglas A. Moore, Fairview, TX (US)

(73) Assignee: Toyota Motor North America, Inc., Plano, TX (US)

(*) Notice: Subject to any disclaimer, the term of this patent is extended or adjusted under 35 U.S.C. 154(b) by 81 days.

(21) Appl. No.: 16/105,483

(22) Filed: Aug. 20, 2018

(65) Prior Publication Data

US 2020/0057446 A1 Feb. 20, 2020

(51) Int. Cl.
- *G05D 1/02* (2020.01)
- *A61G 5/10* (2006.01)
- *G05D 1/00* (2006.01)

(52) U.S. Cl.
CPC ............. *G05D 1/0212* (2013.01); *A61G 5/10* (2013.01); *G05D 1/0011* (2013.01)

(58) Field of Classification Search
CPC combination set(s) only.
See application file for complete search history.

(56) References Cited

U.S. PATENT DOCUMENTS

| | | | |
|---|---|---|---|
| 5,531,284 | A | 7/1996 | Okamoto |
| 7,967,174 | B2 | 6/2011 | Lauber |
| 9,314,929 | B2 | 4/2016 | Hyde et al. |
| 9,724,829 | B2 | 8/2017 | Hyde et al. |
| 9,870,683 | B1 | 1/2018 | Pious |
| 2012/0279789 | A1 | 11/2012 | Brill et al. |
| 2014/0277841 | A1 | 9/2014 | Klicpera et al. |
| 2016/0052137 | A1* | 2/2016 | Hyde ................. B25J 11/009 701/24 |
| 2017/0360632 | A1* | 12/2017 | Slorance ................. A45C 5/14 |
| 2018/0029624 | A1 | 2/2018 | Matsue et al. |
| 2019/0232992 | A1* | 8/2019 | Bondaryk ............ G05D 1/0212 |

FOREIGN PATENT DOCUMENTS

| | | |
|---|---|---|
| ES | 2607223 A1 | 3/2017 |
| KR | 20130008389 A | 1/2013 |
| WO | 2016141091 A1 | 9/2016 |

OTHER PUBLICATIONS

International Search Report and Written Opinion dated Nov. 8, 2019 for PCT/US2019/046871.

* cited by examiner

*Primary Examiner* — Abby Y Lin
*Assistant Examiner* — Renee LaRose
(74) *Attorney, Agent, or Firm* — Dinsmore & Shohl LLP (57) ABSTRACT

An autonomously moveable storage unit includes one or more processors, a storage container configured to contain a stored item, a moveable base coupled to the storage container and communicatively coupled to the one or more processors, and one or more memory modules communicatively coupled to the one or more processors. The one or more memory modules store logic that, when executed by the one or more processors, cause the autonomously moveable storage unit to actuate the moveable base to automatically move the autonomously moveable storage unit from a docked position coupled to the wheelchair to an undocked position uncoupled from the wheelchair, and actuate the moveable base to automatically move the autonomously moveable storage unit from the undocked position to the docked position.

20 Claims, 6 Drawing Sheets

AUTONOMOUSLY MOVEABLE STORAGE UNITS AND WHEELCHAIR STORAGE SYSTEMS

TECHNICAL FIELD

The present specification generally relates to autonomously moveable storage units and, more specifically, wheelchair storage systems with autonomously moveable storage units.

BACKGROUND

Users of wheelchairs may need to transport various articles with them. However, storage on wheelchairs is often very limited. Sometimes bags can be attached to the sides of the wheelchair to provide additional storage of personal items. However, side storage units may be knocked off when traveling through narrow passageways. Luggage carriers that are able to follow a wheelchair are available, but they tend to be too large and slow for application in multiple environments.

Accordingly, need exists for autonomously moveable storage units and alternative wheelchair storage systems.

SUMMARY

In one embodiment, an autonomously moveable storage unit includes one or more processors, a storage container configured to contain a stored item, a moveable base coupled to the storage container and communicatively coupled to the one or more processors, and one or more memory modules communicatively coupled to the one or more processors. The one or more memory modules store logic that, when executed by the one or more processors, cause the autonomously moveable storage unit to actuate the moveable base to automatically move the autonomously moveable storage unit from a docked position coupled to the wheelchair to an undocked position uncoupled from the wheelchair, and actuate the moveable base to automatically move the autonomously moveable storage unit from the undocked position to the docked position.

In another embodiment, a wheelchair storage system includes a wheelchair and an autonomously moveable storage unit. The autonomously moveable storage unit includes one or more processors, a storage container configured to contain a stored item, a moveable base coupled to the storage container and communicatively coupled to the one or more processors, and one or more memory modules communicatively coupled to the one or more processors. The one or more memory modules store logic that, when executed by the one or more processors, causes the autonomously moveable storage unit to automatically move the autonomously moveable storage unit from a docked position coupled to the wheelchair to an undocked position uncoupled from the wheelchair, and automatically move the autonomously moveable storage unit from the undocked position to the docked position.

In yet another embodiment, a wheelchair storage system includes a wheelchair and an autonomously moveable storage unit. The wheelchair includes a motorized wheelchair base. The autonomously moveable storage unit includes one or more processors, a storage container configured to contain a stored item, a moveable base coupled to the storage container and communicatively coupled to the one or more processors, and one or more memory modules communicatively coupled to the one or more processors. The one or more memory modules store logic that, when executed by the one or more processors, causes the autonomously moveable storage unit to automatically move the autonomously moveable storage unit from a docked position coupled to the wheelchair to an undocked position uncoupled from the wheelchair, and automatically move the autonomously moveable storage unit from the undocked position to the docked position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments according to the present disclosure are directed toward autonomously moveable storage units and wheelchair storage systems that include an autonomously moveable storage unit. The autonomously moveable storage unit is configured to autonomously move between a docked position coupled to a wheelchair, and an undocked position uncoupled from the wheelchair. The autonomously moveable storage unit is configured to store an item or items therein such that a user of the wheelchair may travel with the item or items. When in the docked position, the autonomously moveable storage unit may be transported along with the wheelchair without hindering operation of the wheelchair. Because wheelchair storage system can cause the autonomously moveable storage unit dock and undock itself from a wheelchair, the autonomously moveable storage unit may be docked to the wheelchair at positions generally inaccessible to the user such as, for example, the back of the wheelchair or within a base of the wheelchair. Such locations for storage are advantageous as they will not undesirably increase a width of the wheelchair making it capable of traveling through doorways unimpaired by additional storage coupled to the sides of the wheelchair.

Figure 1:
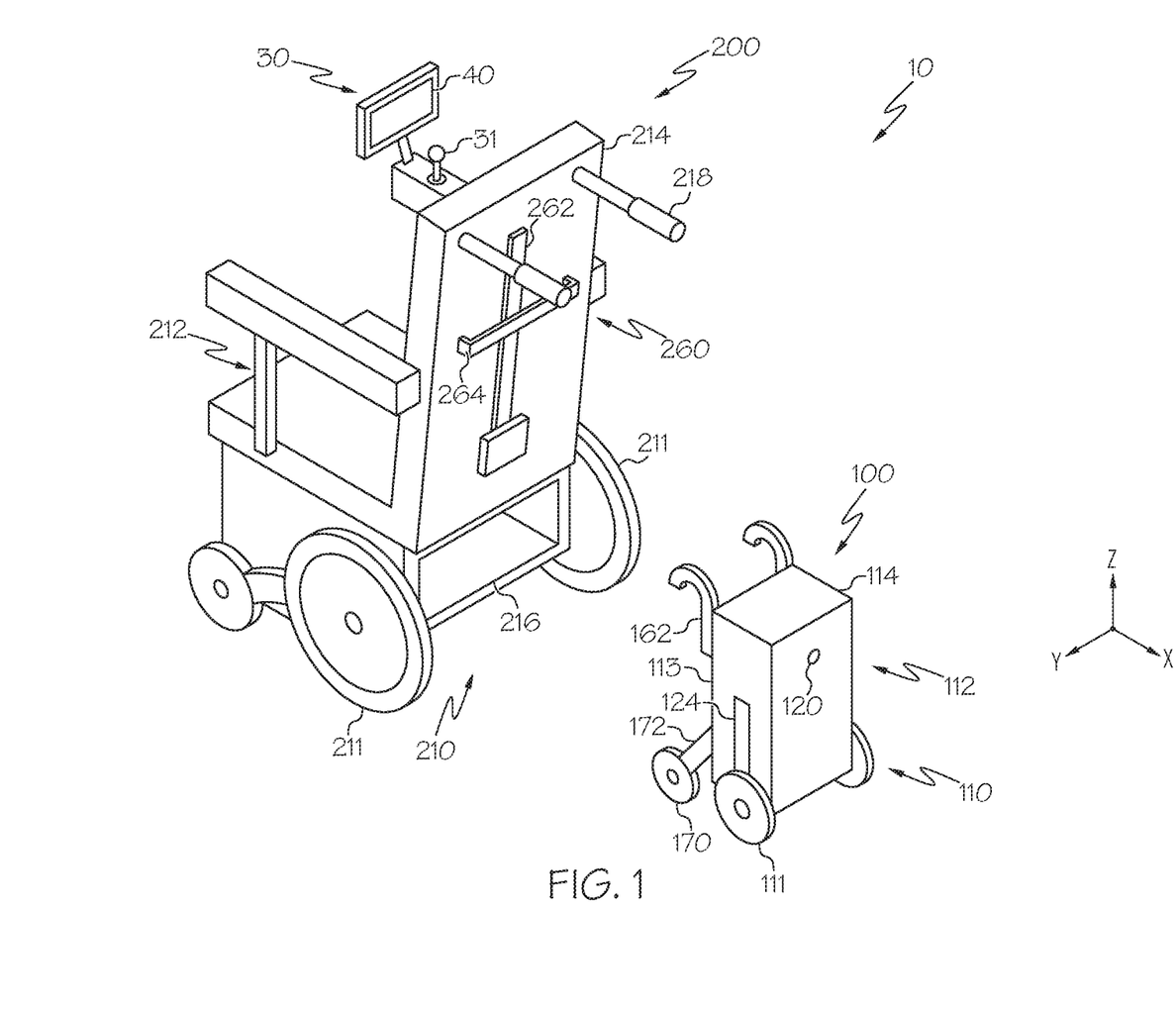
FIG. 1 depicts a perspective view of a wheelchair storage system including an autonomously moveable storage unit and a wheelchair according to one or more embodiments shown and described herein.

Referring now to FIG. 1, a wheelchair storage system 10 is generally depicted. The wheelchair storage system 10 includes an autonomously moveable storage unit 100. In some embodiments, the wheelchair storage system 10 also includes a wheelchair 200. As will be described in greater detail herein, the autonomously moveable storage unit 100 is configured to move from a docked position coupled to the wheelchair 200 to an undocked position uncoupled from the wheelchair 200. Furthermore, the autonomously moveable storage unit 100 is configured to move from the undocked position to the docked position. As will be described in greater detail herein, when in the docked position, the autonomously moveable storage unit 100 may be coupled to any portion of the wheelchair 200, for example the wheelchair base 210 or the back of the wheelchair 200. In some embodiments, when in the docked position, the autonomously moveable storage unit 100 is elevated from a surface on which the wheelchair 200 sits.

The autonomously moveable storage unit 100 generally includes a storage container 112 configured to contain a stored item. Stored items may generally include any item which may be stored within the storage container 112. For example the stored item may include, but is not limited to, personal items of the user (e.g., clothing, books, food, etc.). The storage container 112 may be any suitable structure for securing a stored item therein. For example, the storage container 112 may define a storage portion 113 and a lid portion 114 coupled to the storage portion 113. The lid portion 114 may be moveable relative to the storage portion 113. For example, the lid portion 114 may be hingedly connected to the storage portion 113 (see e.g., FIG. 5). In some embodiments, the lid portion 114 may be secured in a closed position by a locking mechanism 116 (schematically illustrated in FIG. 2) or similar structure. In some embodiments, a zipper may secure the lid portion 114 to the storage portion 113 in a closed position. In some embodiments, the storage portion 113 may be closed with a drawstring closure.

The autonomously moveable storage unit 100 may further include a moveable base 110 coupled to the storage container 112. The moveable base 110 may be configured to transport the autonomously moveable storage unit 100 along a surface. For example, the moveable base 110 may include motorized wheels 111 that enable to autonomously moveable storage unit 100 to move between various locations (e.g., called positions) as will be further described herein. Accordingly, the moveable base 110 may include a motor (e.g., an electric motor) housed within the moveable base 110 operatively coupled to the motorized wheels 111 to cause the motorized wheels 111 to rotate.

In some embodiments, the autonomously moveable storage unit 100 may include a support wheel 170 attached to either the moveable base 110 or the storage container 112 by an arm 172 to aid in balancing the autonomously moveable storage unit 100. In some embodiments the support wheel 170 may be a motorized wheel similar to the motorized wheels 111 described above. In some embodiments there may be no support wheel 170 or arm 172.

In some embodiments, the autonomously moveable storage unit 100 may include one or more hooks 162 that allow the autonomously moveable storage unit 100 to latch on to the wheelchair 200. The one or more hooks 162 may extend from the storage container 112 and/or the moveable base 110. As will be described in greater detail herein, the wheelchair 200 may include an accessory rail 264 on which the one or more hooks 162 of the autonomously moveable storage unit 100 may latch such that the autonomously moveable storage unit 100 is coupled to the wheelchair 200. These and additional features of the autonomously moveable storage unit 100 will be described in greater detail below.

In some embodiments, the autonomously moveable storage unit 100 may be height adjustable. For example, in the illustrated embodiment, the autonomously moveable storage unit 100 may include an adjustment passage 124 that extends through or is formed in the moveable base 110. An actuator 180 (generally illustrated in FIG. 2) may be coupled to the motorized wheels 111 and operable to adjust a position of the motorized wheels 111 of the moveable base 110 along the adjustment passage 124 in the Z-direction of the depicted coordinate axes. For example, it is contemplated that an axle of the motorized wheels 111 may extend through the adjustment passage 124 and the actuator 180 (e.g., a linear actuator) may move be operatively coupled to the axle and configured to facilitate motion of both motorized wheels 111 to various positions along the adjustment passage 124. Height adjustability may aid a user sitting within the wheelchair 200 to reach items stored within the autonomously moveable storage unit 100. In some embodiments, and as will be described in greater detail herein, height adjustability may aid the autonomously moveable storage unit 100 in moving to a docked position.

Still referring to FIG. 1, the wheelchair 200 includes a wheelchair base 210. A seat portion 212 configured to support a user in a seated position is coupled to the wheelchair base 210. The wheelchair base 210 may include wheels 211, which may be either automatically or manually driven. For example, the wheelchair base 210 may be a motorized wheelchair base 210 that includes a motor to drive the wheels 211 of the wheelchair 200. In such embodiments, a user may use one or more user input controls 30, as will be described in greater detail herein, such as a joystick 31, to maneuver the wheelchair 200 with the motorized wheelchair base 210. In manually driven embodiments, for example, the user may propel the wheelchair 200 by using their hands to spin the wheels 211 or another person may push the wheelchair 200 from behind. For example, the seat portion 212 may include a backrest 214 that includes handles 218 with which an operator may manually push the wheelchair 200.

Coupled to the backrest 214 may be an accessory rail 264. The accessory rail 264 may be coupled to the backrest 214 so as to be stationary. In other embodiments, the accessory rail 264 may be part of an accessory system 260 coupled to the backrest 214 of the wheelchair 200. For example, and as will be described in greater detail herein, the accessory system 260 may include a lifting portion 262 operatively coupled to the accessory rail 264 and operable to move and/or guide the accessory rail 264 in the +/−Z direction of the depicted coordinate axes. For example, and not as a limitation, the lifting portion 262 may define a track and the accessory rail 264 may include pinion gears that interface with the track. The pinion gears may be motorized to cause the accessory rail 264 to move up and down the lifting portion 262. It is also contemplated that the accessory rail 264 may be raised or lowered by the lifting portion 262 through other means such as linear actuators, pulley systems, and the like. As will be described in greater detail, in some embodiments, the autonomously moveable storage unit 100 may dock to the accessory rail 264 using the one or more hooks 162 of the autonomously moveable storage unit 100. In some embodiments, the wheelchair 200 may not include an accessory rail 264.

In some embodiments, the wheelchair base 210 defines a storage space 216 positioned between the wheels 211. In such embodiments, the autonomously moveable storage unit 100 may be configured to fit within the storage space 216 when in the docked position (see FIGS. 4A-4C). For example, the wheelchair base 210 may comprise a lifting system 230 (see FIG. 2), for example a hydraulic lift system, or the like, which can raise and lower the storage space 216 of the wheelchair base 210 relative to a surface on which the wheelchair 200 sits. When the storage space 216 of the wheelchair base 210 is lowered, the autonomously moveable storage unit 100 may autonomously drive in and out of the storage space 216 with the moveable base 110.

Figure 2:
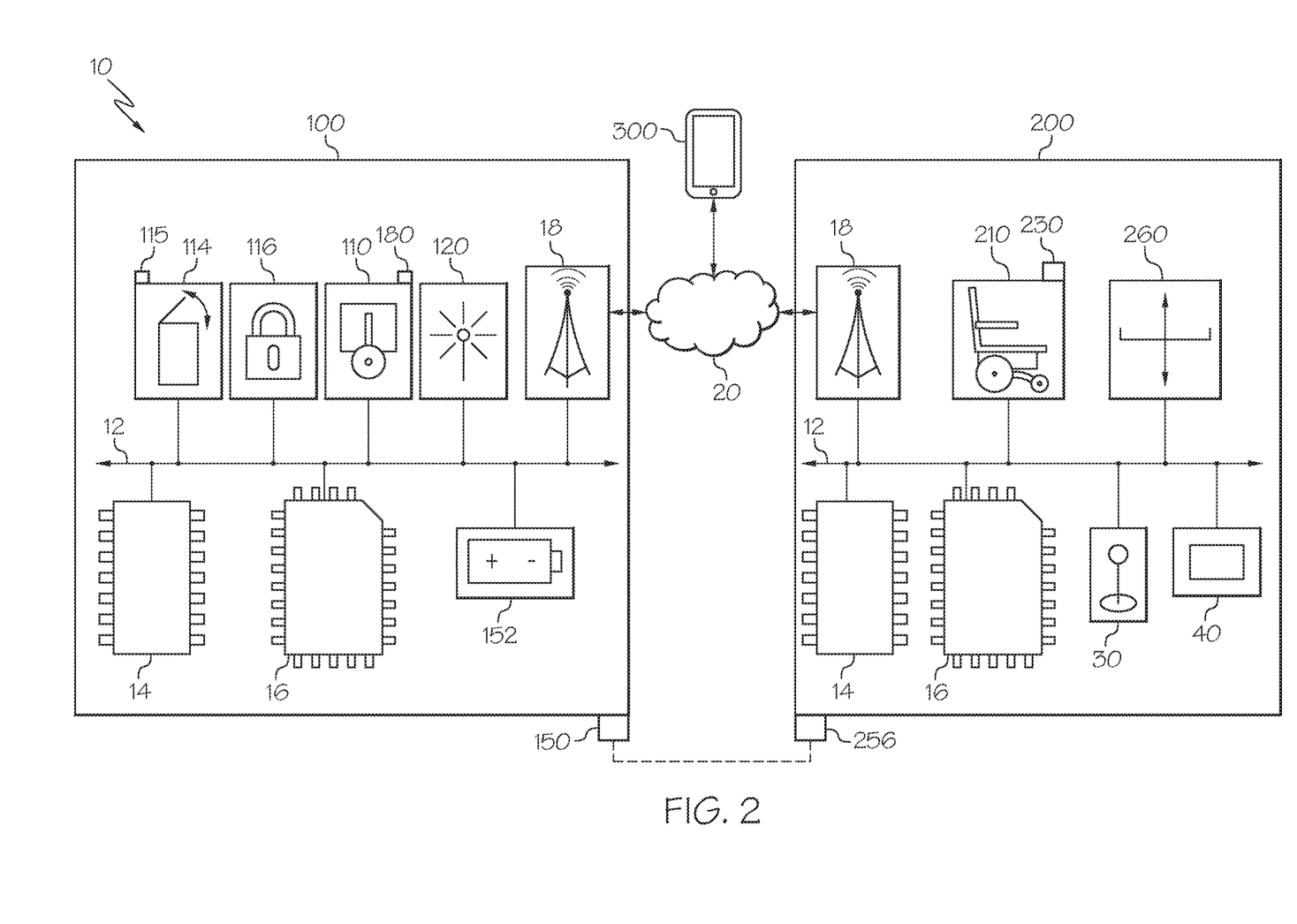
FIG. 2 schematically depicts additional components of the wheelchair storage system of FIG. 1, according to one or more embodiments shown and described herein.

FIG. 2 schematically illustrates additional components of the wheelchair storage system 10. As noted above, the wheelchair storage system 10 may generally include the autonomously moveable storage unit 100 and the wheelchair 200. The wheelchair system 10 further includes a communication path 12, one or more processors 14, one or more memory modules 16, and network interface hardware 18 integrated into the autonomously moveable storage unit 100, the wheelchair 200, or a combination thereof. Although, the wheelchair storage system 10 is illustrated as including various modules communicatively coupled to one another, it is noted that wheelchair storage system 10 may have a fewer or greater number of modules than that illustrated without departing from the scope of the present disclosure. Although various modules are illustrated as being internal or external to the wheelchair 200 or the autonomously moveable storage unit 100, the various modules may be integral with the autonomously moveable storage unit 100, the wheelchair 200, or a combination thereof. The wheelchair storage system 10 depicted in FIG. 2 includes the communication path 12, the one or more processors 14, the one or more memory modules 16, and the network interface hardware 18 in each of the autonomously moveable storage unit 100 and wheelchair 200. However, embodiments are not limited thereto.

As described above, the communication path 12 provides data interconnectivity between various modules of the wheelchair storage system 10. Specifically, each of the modules can operate as a node that may send and/or receive data. In some embodiments, the communication path 12 includes a conductive material that permits the transmission of electrical data signals to processors 14, memories, sensors, and actuators throughout the wheelchair storage system 10. In another embodiment, the communication path 12 can be a bus, such as for example a LIN bus, a CAN bus, a VAN bus, and the like. In further embodiments, the communication path 12 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

To facilitate wireless communication between the various modules of the wheelchair storage system 10, the autonomously moveable storage unit 100 and the wheelchair 200 may include network interface hardware 18 for communicatively coupling the one another, or a mobile device 300, over a network 20. The network interface hardware 18 can be communicatively coupled to the communication path 12 and can be any device capable of transmitting and/or receiving data via the network 20. Accordingly, the network interface hardware 18 can include a communication transceiver for sending and/or receiving any wired or wireless communication. For example, the network interface hardware 18 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 18 includes hardware configured to operate in accordance with the Bluetooth wireless communication protocol. In another embodiment, network interface hardware 18 may include a Bluetooth send/receive module for sending and receiving Bluetooth communications to/from, for example, the autonomously moveable storage unit 100, the mobile device 300 (e.g., mobile phones, smartphones, tablets, laptop computers, and/ or any other mobile device 300 capable of being communicatively coupled to the wheelchair storage system 10), and/or the wheelchair 200.

As described above, the autonomously moveable storage unit 100 may communicate, through the network interface hardware 18, with the network 20 to communicatively couple the autonomously moveable storage unit 100, the mobile device 300 and/or the wheelchair 200. As noted above, in one embodiment, the network 20 is a personal area network that utilizes Bluetooth technology to communicatively couple the autonomously moveable storage unit 100, the mobile device 300, and/or the wheelchair 200. In other embodiments, the network 20 may include one or more computer networks (e.g., a personal area network, a local area network, or a wide area network), cellular networks, satellite networks and/or a global positioning system and combinations thereof. Accordingly, the autonomously moveable storage unit 100 can be communicatively coupled to the network 20 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

The one or more processors 14 are communicatively coupled to the other modules of the wheelchair storage system 10 over the communication path 12 and/or through the network 20 with the network interface hardware 18. The one or more processors 14 may include any device capable of executing machine-readable instructions stored on a non-transitory computer-readable medium. Accordingly, each processor may include a controller, an integrated circuit, a microchip, a computer, and/or any other computing device. The one or more processors 14 may be integral with the wheelchair 200, the autonomously moveable storage unit 100, a remote device 300 (e.g., smartphone, tablet, etc.), or a combination thereof.

The one or more memory modules 16 are communicatively coupled to the one or more processors 14 over the communication path 12 and/or through the network 20 with the network interface hardware 18. The one or more memory modules 16 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the autonomously moveable storage unit 100 and/or external to the autonomously moveable storage unit 100 (e.g., within the wheelchair 200, or within a remote device 300). The one or more memory modules 16 may be configured to store one or more pieces of logic, as described in more detail below. The embodiments described herein may utilize a distributed computing arrangement to perform any portion of the logic described herein.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the processor, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. As will be described in greater detail herein, logic stored on the one or more memory modules 16, when executed by the one or more processors 14, can cause the autonomously moveable storage unit 100 to move from a docked position coupled to the wheelchair 200 to an undocked position uncoupled from the wheelchair 200. Furthermore, the logic may further cause the autonomously moveable storage unit 100 to move to a called position that is reachable by a user or to a different called position, e.g., a position remote from the user to, for example, receive an item in a remote location (e.g., from a store clerk, a friend, a colleague, etc.).

As noted herein, the autonomously moveable storage unit 100 includes a moveable base 110. The moveable base 110 of the autonomously moveable storage unit 100 may be communicatively coupled to the one or more processors 14. As noted herein, logic stored on the one or more processors 14 can cause the autonomously moveable storage unit 100 to move from a docked position coupled to the wheelchair 200 to an undocked position uncoupled from the wheelchair 200. For example, the logic stored on the one or more processors 14 can cause the autonomously moveable storage unit 100 to actuate the moveable base 110 to automatically move the autonomously moveable storage unit 100 from a docked position coupled to a wheelchair 200 to an undocked position uncoupled from the wheelchair 200 and actuate the moveable base 110 to automatically move the autonomously moveable storage unit 100 from the undocked position to the docked position. In the undocked position, logic stored on the one or more memory modules 16 when executed by the one or more processors 14 may cause the autonomously moveable storage unit 100 to actuate the moveable base 110 to navigate the moveable base 110 to a called position, as will be described in greater detail below, move to a called position that is reachable by a user or to a different called position, e.g., a position remote from the user to, for example, receive an item in a remote location (e.g., from a store clerk, a friend, a colleague, etc.).

In some embodiments and as described above, an actuator 180 for adjusting a height of autonomously moveable storage unit 100 may also be communicatively coupled to the one or more processors 14. Accordingly, the one or more processors 14 may execute logic to cause the wheelchair storage system 10 to adjust a vertical height (Z-direction of the depicted coordinate axes, shown in FIG. 1) of the autonomously moveable storage unit 100 with the actuator 180.

Still referring to FIG. 2, the autonomously moveable storage unit 100 may include a variety of modules coupled to and/or contained within the autonomously moveable storage unit 100. For example, the autonomously moveable storage unit 100 may further include, but is not limited to, the moveable base 110, one or more environment sensors 120, a battery level sensor 152, the locking mechanism 116 (described above), and a lid actuator 115.

The one or more environment sensors 120 may assist the wheelchair storage system 10 in navigating the autonomously moveable storage unit 100 around an environment. The one or more environment sensors 120 may be communicatively coupled to the one or more processors 14 and output a signal indicative of the environment of the autonomously moveable storage unit 100. For example, the signal indicative of the environment of the autonomously moveable storage unit 100 may be indicative of obstacles, locations within the environment, and the like. The one or more environment sensors 120 may include, but are not limited to, LiDAR sensors, RADAR sensors, optical sensors (e.g., cameras, laser sensors, proximity sensors, location sensors (e.g., GPS modules), and the like. The one or more processors 14, based on the signal of the one or more environment sensors 120, may execute logic to cause the wheelchair storage system 10 to determine a path to a called position with the one or more environment sensors 120, and move the autonomously moveable storage unit 100 with the moveable base 110 along the path to the called position. For example, the autonomously moveable storage unit 100 may determine a path free of obstacles or navigate around obstacles located on a path to the called position. Similarly, when returning to the docked position from the called position, the wheelchair storage system 10, based on the signal output by the one or more environment sensors 120, determine a path back to a docking position wherein the autonomously moveable storage unit 100 may move to the docked position coupled to the wheelchair 200.

Referring again to FIG. 1, in some embodiments, the one or more environment sensors 120 may be coupled to one of the storage container 112 and the moveable base 110 of the autonomously moveable storage unit 100. In some embodiments, the one or more environment sensors 120 may include a camera. In some cases, a video feed from the camera may be accessible by a user when the autonomously moveable storage unit 100 is positioned in the docked position. For example, when the autonomously moveable storage unit 100 is docked to the wheelchair 200, the camera may capture video of the environment of the wheelchair storage system 10 to the rear of the wheelchair 200 (e.g., X direction of the depicted coordinate axes). Accordingly, the camera may act as a backup camera for the wheelchair storage system 10. In such embodiments, the camera may be a wide angle camera.

Referring collectively to FIGS. 1 and 2, to display the video feed of the camera, the wheelchair chair 200 may include a display 40 communicatively coupled to the camera over the network 20 with the network interface hardware 18. The display 40 may include any medium capable of transmitting an optical output such as, for example, a cathode ray tube, light emitting diodes, a liquid crystal display, a plasma display, or the like. Moreover, the display 40 may be a touch screen that, in addition to providing optical information, detects the presence and location of a tactile input upon a surface 50 of or adjacent to the display 40. Accordingly, the display 40 may receive mechanical input directly upon the optical output provided by the display 40. Referring to FIG. 1, the display 40 is coupled to the wheelchair 200. However, it is contemplated that the display 40 may instead be a user's mobile device 300. Accordingly, the video feed of the camera may be communicated over the network interface hardware 18 to mobile device 300 for display 40. Though not shown, it is contemplated the video feed from the camera may be automatically displayed when the wheelchair 200 is driven in reverse. Accordingly, the wheelchair 200 may include sensors that output a signal indicative of the wheelchair 200 moving in reverse (e.g., driving mode sensors (forward, reverse), motion sensors, and the like). In other embodiments, the user may prompt display from the camera feed using one or more user input controls 30 described below.

As noted herein, the autonomously moveable storage unit 100 may include a rechargeable battery 150. The rechargeable battery 150 may be operatively coupled to the various modules of the autonomously moveable storage unit 100 to provide power thereto. As noted herein, the rechargeable battery 150 may have a battery level sensor 152 that outputs a signal indicative of a charge level of the rechargeable battery 150. In some embodiments, when the rechargeable battery 150 has a low level of charge (e.g., less than 10%, less than 5%, less than 3%, or less than 1%), the autonomously moveable storage unit 100 may output a warning (e.g., to the display 40 and/or the mobile device 300) indicative that that rechargeable battery 150 needs to be charged. In some embodiments, the autonomously moveable storage unit 100 may move to a docked position automatically when the charge level, as indicated by the output signal of the battery level sensor 152, is low. In the docking position, the rechargeable battery 150 of the autonomously moveable storage unit 100 may become operatively coupled to a power source 256 (e.g., battery) of the wheelchair 200 and recharge from the power source 256 of the wheelchair 200.

In some embodiments, as noted herein, the autonomously moveable storage unit 100 may include a locking mechanism 116 for locking the lid portion 114 of the storage container 112. In some embodiments, the locking mechanism 116 may be a smart lock that is communicatively coupled to the one or more processors 14, wherein the one or more processors 14 may execute logic to cause the wheelchair storage system 10 to lock and unlock the locking mechanism 116 such that the lid portion 114 may be opened. For example, the locking mechanism 116 may include any lock that can be moved from a locked position to an unlocked position including, but not limited to, a padlock, a sliding lock, a cam lock, etc. In some embodiments, the locking mechanism 116 may automatically unlock when the autonomously moveable storage unit 100 reaches the called position. In some embodiments, there may be no locking mechanism 116.

In some embodiments, the autonomously moveable storage unit 100 may include a lid actuator 115 operatively coupled tot the lid portion 114 of the storage container 112. The lid actuator 115 may be any device operable to move the lid portion 114 from a closed position, extending over an interior of the storage portion 113 to, an open position, wherein the lid portion 114 is moved to allow access to the interior of the storage portion 113 of the storage container 112. For example, the lid actuator 115 may include a linear actuator, or similar device. In some embodiments, the lid actuator 115 may be automatically actuated to open the lid portion 114 when the autonomously moveable storage unit 100 reaches the called position. In some embodiments there may be no lid actuator 115.

As noted above, the wheelchair 200 may be communicatively coupled to the autonomously moveable storage unit over the network 20 with the network interface hardware. The wheelchair 200 may further include various modules to which the one or more processors 14 are communicative coupled that interact with the autonomously moveable storage unit 100.

For example, still referring to FIG. 2, the wheelchair storage system 10 may further include one or more user input devices 30 communicatively coupled to the one or more processors 14 over the communication path 12 and to the autonomously moveable storage unit 100 over the network 20 with the network interface hardware 18. For example, the one or more user input devices 30 may be included in the controls of the wheelchair 200 or may be provided by a mobile device 300. The one or more user input devices 30 may be any device capable of transforming mechanical, optical, or electrical signals into a data signal capable of being transmitted with the communication path 12. Specifically, the one or more user input devices 30 may include any number of movable objects that each transform physical motion into a data signal that can be transmitted to over the communication path 12 such as, for example, a button, a switch, a knob, a joystick, a touchscreen, a microphone or the like.

The one or more user input devices 30 may allow a user to control a movement of the autonomously moveable storage unit 100. In particular, the one or more user input devices 30 may allow a user to call and/or dismiss the autonomously moveable storage unit 100 to and from a called position. For example, using the one or more user input devices 30 the user can call the autonomously moveable storage unit 100 to a called position wherein the autonomously moveable storage unit 100 is reachable by a user. In some embodiments, the called position may be any position indicated by a user including positions remote from the user (e.g., to a store clerk, cashier, etc.). Once called, the one or more processors 14 may execute logic stored on the one or more memory modules 16 to cause the autonomously moveable storage unit 100 to automatically move the autonomously moveable storage unit 100 from a docked position, wherein the autonomously moveable storage unit 100 is coupled to the wheelchair 200, to an undocked position, wherein the autonomously moveable storage unit 100 is uncoupled from the wheelchair 200 and is able to move freely relative to the wheelchair 200. Once in the undocked position, the autonomously moveable storage unit 100 may actuate the moveable base 110 to automatically move the autonomously moveable storage unit 100 to the called position as indicated by the user with the one or more user input devices 30. When dismissed, the autonomously moveably storage unit 100 may actuate the moveable base 110 to automatically move the autonomously moveable storage unit 100 from the called position back to the docked position. Examples will be described in greater detail below. It is noted that in some embodiments, the user can directly control the movement of the autonomously moveable storage unit 100 with the one or more user input devices 30. For example, the user may use a joystick 31 (see FIG. 1) or similar device to remotely control the movement of the autonomously moveable storage unit 100 to a desired position.

Figure 3A:
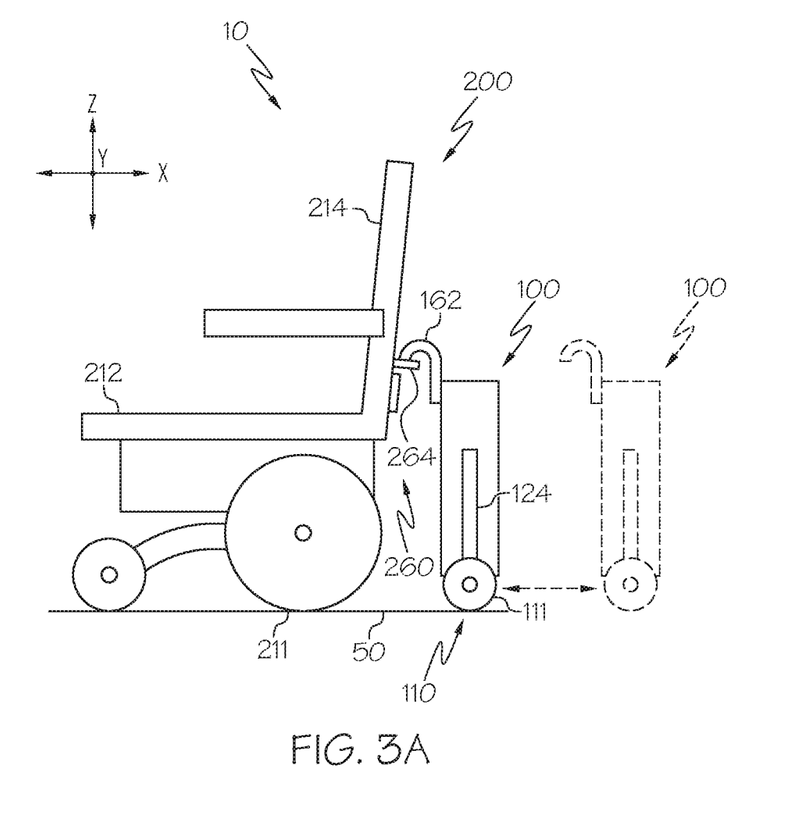
FIG. 3A generally depicts an autonomously moveable storage unit moving between an undocked position and a docked position, according to one or more embodiments shown and described herein.
Figure 3B:
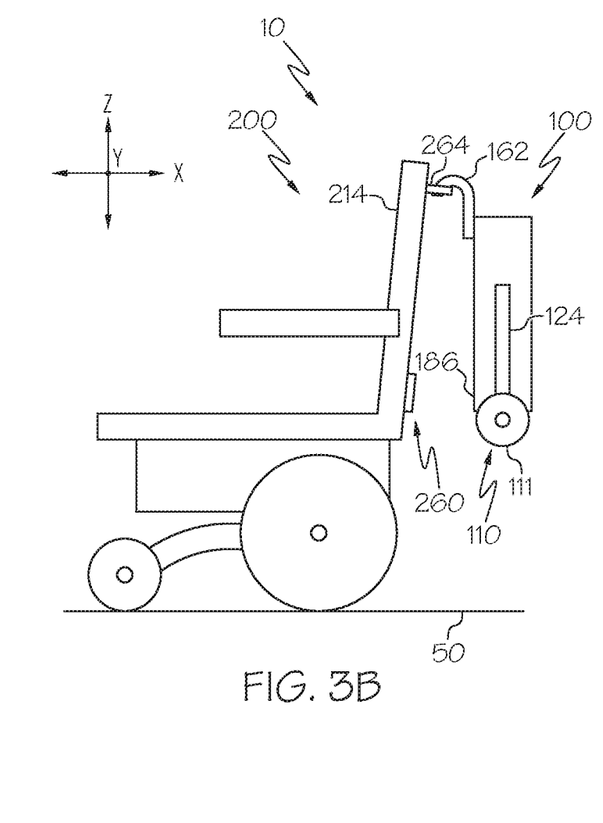
FIG. 3B depicts the autonomously moveable storage unit of FIG. 3A docked to the wheelchair and elevated above a surface, according to one or more embodiments shown and described herein.

As noted herein, the wheelchair 200 may include an accessory system 260. The accessory system 260 of the wheelchair 200 may be communicatively coupled to the one or more processors 14. That is, the one or more processors 14 may operate the accessory system 260 to lift or lower the accessory rail 264 relative to the lifting portion 262, shown in FIG. 1. Referring now to FIG. 3A, the accessory rail 264 is illustrated in a lowered position. In this lowered position the autonomously moveable storage unit 100 may move freely relative to the wheelchair 200. Referring to FIG. 3B, the one or more processors 14 may execute logic to lift the accessory rail 264 of the accessory system 260 to a raised position. In this raised position, the autonomously moveable storage unit 100 is in a docked position. Accordingly, when in the docked position, the autonomously moveable storage unit 100 may be elevated from a surface 50 on which the wheelchair 200 sits.

As an example of operation, and starting with FIG. 3B, when a user calls the autonomously moveable storage unit 100, with the one or more user input devices 30 (shown in FIG. 2), the accessory system 260 may lower the accessory rail 264 from the raised position, wherein the autonomously moveable storage unit 100 is in the docked position, to a lowered position (see FIG. 3A). In the lowered position, the moveable base 110 of the autonomously moveable storage unit 100 may be in contact with the surface 50. The accessory rail 264 may be lowered to a position below the one or more hooks 162 of the autonomously moveable storage unit 100 such that the autonomously moveable storage unit 100 is undocked from the wheelchair 200 and free to move away from the wheelchair 200, as illustrated by dashed lines.

To move the autonomously moveable storage unit 100 back to the docked position, the wheelchair storage system 10 may use the one or more environment sensors 120 to determine that the autonomously moveable storage unit 100 is properly positioned to re-dock to the accessory rail 264 (e.g., that one or more hooks 162 are positioned so as to catch onto the accessory rail 264 as it is raised.). When properly positioned, the autonomously moveable storage unit 100 may lift the accessory rail 264 back to the raised position and move the autonomously moveable storage unit 100 to the docked position.

Figure 3C:
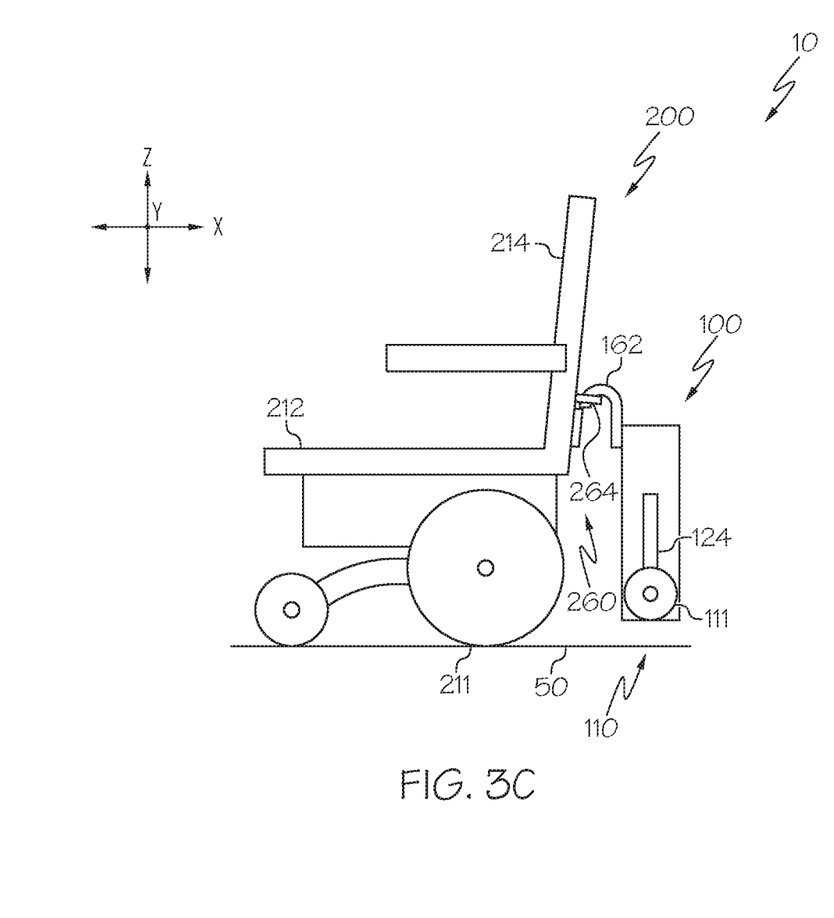
FIG. 3C alternatively depicts the autonomously moveable storage unit of FIG. 3A docked to the wheelchair and elevated above a surface, according to one or more embodiments shown and described herein

FIG. 3C illustrates an alternative docking arrangement. In this embodiment, the accessory rail 264 may be stationary. Accordingly, instead of the accessory rail 264 being raised to catch the one or more hooks 162 of the autonomously moveable storage unit 100, the height of the autonomously moveable storage unit 100 may be adjusted to cause the one or more hooks 162 to catch onto the accessory rail 264. For example, the motorized wheels 111 of the moveable base 110 may be moved up through the adjustment passage 124 by the actuator 180 (shown in FIG. 2), to cause the one or more hooks 162 to hook over the accessory rail 264. The motorized wheels 111 of the moveable base 110 may continue to move through the adjustment passage 124 until the autonomously moveable storage unit 100 is elevated from the surface 50 on which the wheelchair 200 sits. To become undocked (as shown in FIG. 3A), the one or more processors 14 may execute logic to cause the actuator 180 to move the motorized wheels 111 through the adjustment passage 124 such that the motorized wheels 111 of the moveable base 110 contact the ground and raise the one or more hooks 162 above the accessory rail 264.

Referring again to FIG. 2, when the wheelchair base 210 includes a motorized wheelchair base 210, the wheelchair base 210 may be communicatively coupled to the one or more processors 14. Accordingly, the one or more processors 14 may execute logic to cause the wheelchair base 210 to move along a surface 50 or in a particular manner relative to the autonomously moveable storage unit 100. In particular, as noted above, the wheelchair base 210 may include a lifting system 230 to lower the storage space 216 defined within the wheelchair base 210 to the ground (see FIGS. 4A-4C). The one or more processors 14 may execute logic to cause the lifting system 230 to lower the storage space 216 to allow the autonomously moveable storage unit 100 to move so as to be position within the storage space 216.

Figure 4A:
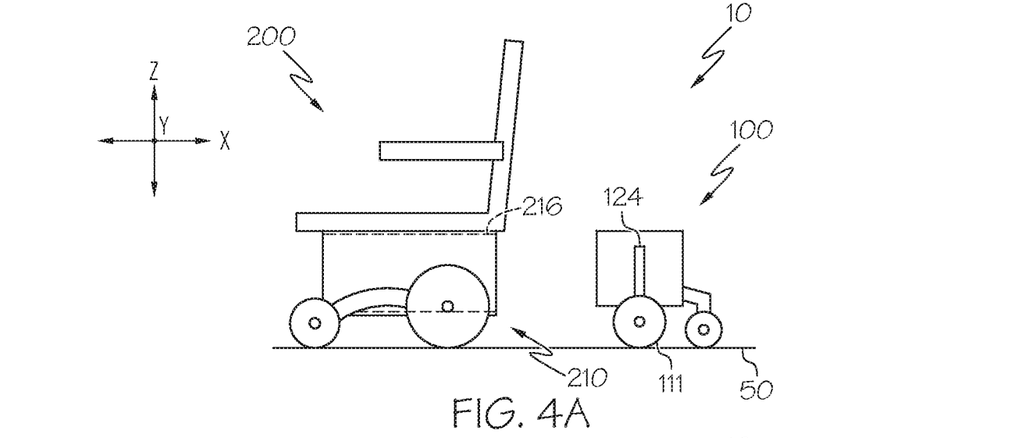
FIG. 4A depicts an autonomously moveable storage unit and a wheelchair, according to one or more embodiments shown and described herein.
Figure 4B:
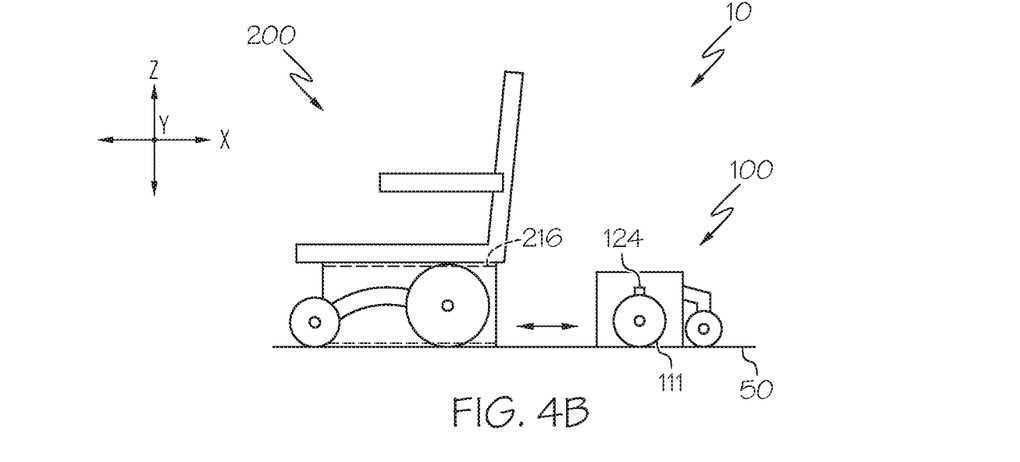
FIG. 4B illustrates the wheelchair of FIG. 4A and the autonomously moveable storage unit positioned to enable to autonomously moveable storage unit to dock within the wheelchair, according to one or more embodiments shown and described herein.
Figure 4C:
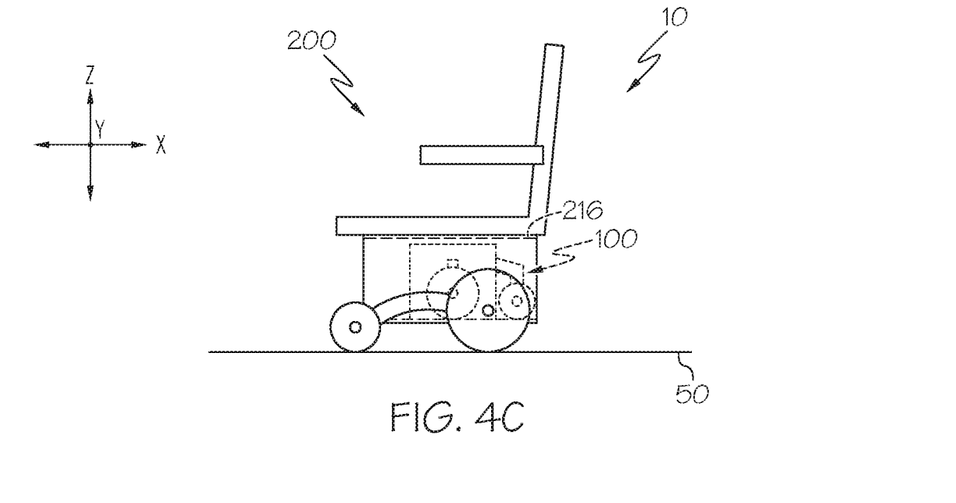
FIG. 4C illustrates the autonomously moveable storage unit of FIG. 4B in a docked position within the wheelchair, according to one or more embodiments shown and described herein.

FIGS. 4A-4C illustrate a docking arrangement wherein the autonomously moveable storage unit 100 is coupled to the wheelchair base 210 when in the docked position. FIG. 4A illustrates the autonomously moveable storage unit 100 positioned in an undocked position. In the illustrated embodiments, the wheelchair 200 includes a wheelchair base 210 that defines the storage space 216. As shown in FIG. 4B the one or more processors 14 cause the wheelchair storage system 10 to lower the storage space 216 of the wheelchair base 210 to, for example, ground level. For example, as noted above, the lifting system 230 (shown in FIG. 2) can lift and lower the storage space 216. The autonomously moveable storage unit 100 may adjust its height using the adjustment passage 124 and actuator 180 so as to be able to fit within the storage space 216. The one or more processors 14 may execute logic to cause the wheelchair storage system 10 to drive the autonomously moveable storage unit 100 into the storage space 216 of the wheelchair base 210 shown in FIG. 4C. In some embodiments the wheelchair 200 may be driven so as to scoop the autonomously moveable storage unit 100 into the storage space 216. Once positioned inside to storage space 216, the storage space 216 may be raised using the lifting system 230 described above, such that the autonomously moveable storage unit 100 is elevated above the surface 50. When called using the one or more user input devices 30, the lifting system 230 may lower the storage space 216 to allow the autonomously moveable storage unit 100 to move to an undocked position.

Figure 5:
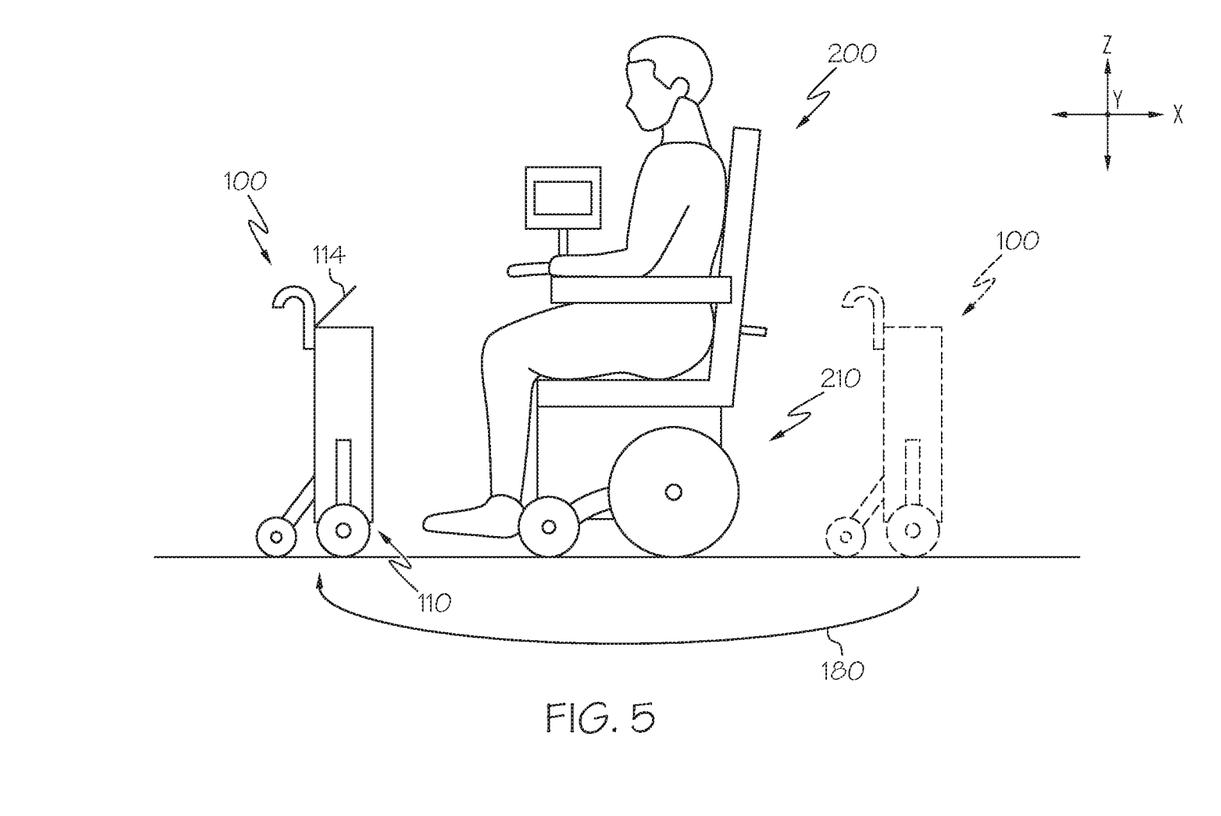
FIG. 5 illustrates an autonomously moveable storage unit moving to a called position, accordingly to one or more embodiments shown and described herein.

FIG. 5 illustrates the autonomously moveable storage unit 100 moving from an undocked position, uncoupled from the wheelchair 200, to a called position. As noted herein, the called position may be any position indicated by the user. In some embodiments, the called position may be a preset position that is accessible by the user, for example, proximate to a user's hand (e.g., the arm rest of the wheelchair 200). As noted above, the one or more environment sensors 120 (shown in FIGS. 1 and 2) may output the signal indicative of the environment of the autonomously moveable storage unit 100. Based on this signal, the one or more processors 14 can execute logic to cause the wheelchair storage system 10 to determine a path from to a called position and move the autonomously moveable storage unit 100 with the moveable base 110 along the path to the called position. In other embodiments, a user may directly control the path the autonomously moveable storage unit 100 moves with the one or more user input devices 30. Once dismissed, the one or more processors 14 may, based on the signal of the one or more environment sensors 120, determine a path to the docked position and move the autonomously moveable storage unit 100 to the docked position. It is contemplated that a user may control the movement of the autonomously moveable storage unit 100 to the docked position, with the one or more user input controls 30.

It should now be understood that embodiments according to the present disclosure are directed toward autonomously moveable storage units and wheelchair storage systems that include an autonomously moveable storage unit. The autonomously moveable storage unit is configured to move between a docked position coupled to a wheelchair, and an undocked position uncoupled from the wheelchair. The autonomously moveable storage unit is configured to store an item or items therein such that a user of the wheelchair may travel with the item. When in the docked position, the autonomously moveable storage unit may be transported along with the wheelchair without hindering operation of the wheelchair. Because wheelchair storage system can cause the autonomously moveable storage unit dock and undock itself from a wheelchair, the autonomously moveable storage unit may be docked to the wheelchair at positions generally inaccessible to the user such as, for example, the back of the wheelchair or within a base of the wheelchair. Such locations for storage are advantageous as they will not undesirably increase a width of the wheelchair making it capable of traveling through doorways.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An autonomously moveable storage unit comprising:
   one or more processors;
   a storage container configured to contain a stored item;
   a moveable base coupled to the storage container and communicatively coupled to the one or more processors; and
   one or more memory modules communicatively coupled to the one or more processors, wherein the one or more memory modules store logic that, when executed by the one or more processors, causes the autonomously moveable storage unit to:
      actuate the moveable base to automatically move the autonomously moveable storage unit including the storage container from a docked position coupled to a wheelchair to an undocked position uncoupled from the wheelchair; and
      actuate the moveable base to automatically move the autonomously moveable storage unit from the undocked position to the docked position.

2. The autonomously moveable storage unit of claim 1, further comprising one or more hooks configured to latch onto the wheelchair when the autonomously moveable storage unit is in the docked position.

3. The autonomously moveable storage unit of claim 1, wherein the autonomously moveable storage unit is height adjustable.

4. The autonomously moveable storage unit of claim 3, further comprising:
   an adjustment passage formed within the moveable base; and
   an actuator operable to adjust a position of a motorized wheel of the moveable base along the adjustment passage to adjust a height of the autonomously moveable storage unit.

5. The autonomously moveable storage unit of claim 1, further comprising one or more environment sensors communicatively coupled to the one or more processors and configured to output a signal indicative of an environment of the autonomously moveable storage unit, wherein the one or more processors, based on the signal of the one or more environment sensors, cause the autonomously moveable storage unit to:
   determine a path to a called position with the one or more environment sensors; and
   actuate the moveable base to automatically move the autonomously moveable storage unit along the path to the called position.

6. The autonomously moveable storage unit of claim 1, further comprising one or more user input devices communicatively coupled to the one or more processors, wherein the one or more user input devices allow a user to control a movement of the autonomously moveable storage unit.

7. A wheelchair storage system comprising:
   a wheelchair; and
   an autonomously moveable storage unit comprising:
      one or more processors;
      a storage container configured to contain a stored item;
      a moveable base coupled to the storage container; and
      one or more memory modules communicatively coupled to the one or more processors, wherein the one or more memory modules store logic that, when executed by the one or more processors, causes the autonomously moveable storage unit to:
         automatically move the autonomously moveable storage unit including the storage container from a docked position coupled to the wheelchair to an undocked position uncoupled from the wheelchair; and
         automatically move the autonomously moveable storage unit from the undocked position to the docked position.

8. The wheelchair storage system of claim 7, wherein the wheelchair comprises an accessory rail and the autonomously moveable storage unit is coupled to the accessory rail when moved to the docked position.

9. The wheelchair storage system of claim 8, wherein the autonomously moveable storage unit further comprises one or more hooks configured to latch onto the accessory rail of the wheelchair when the autonomously moveable storage unit is in the docked position.

10. The wheelchair storage system of claim 7, wherein the wheelchair comprises an accessory system communicatively coupled to the processors of the autonomously moveable storage unit, the accessory system comprising:
  an accessory rail; and
  a lifting portion operatively coupled to the accessory rail and configured to lift or lower the accessory rail.

11. The wheelchair storage system of claim 7, further comprising one or more user input devices communicatively coupled to the one or more processors of the autonomously moveable storage unit, wherein the one or more user input devices allow a user to control a movement of the autonomously moveable storage unit.

12. The wheelchair storage system of claim 11, wherein the autonomously moveable storage unit actuates the moveable base to automatically move the autonomously moveable storage unit from the undocked position to the docked position when dismissed by the user with the one or more user input devices.

13. The wheelchair storage system of claim 7, wherein:
  the wheelchair comprises a power source; and
  the autonomously moveable storage unit comprises a rechargeable battery, wherein the rechargeable battery of the autonomously moveable storage unit is configured to operatively couple to the power source of the wheelchair when the autonomously moveable storage unit is in the docked position to recharge the rechargeable battery of the autonomously moveable storage unit.

14. A wheelchair storage system comprising:
  a wheelchair comprising a motorized wheelchair base;
  an autonomously moveable storage unit comprising:
    one or more processors;
    a storage container configured to contain a stored item;
    a moveable base coupled to the storage container and communicatively coupled to the one or more processors; and
    one or more memory modules communicatively coupled to the one or more processors, wherein the one or more memory modules store logic that, when executed by the one or more processors, causes the autonomously moveable storage unit to:
      automatically move the autonomously moveable storage unit including the storage container from a docked position coupled to the wheelchair to an undocked position uncoupled from the wheelchair; and
      automatically move the autonomously moveable storage unit from the undocked position to the docked position.

15. The wheelchair storage system of claim 14, wherein the wheelchair comprises an accessory rail and the autonomously moveable storage unit is coupled to the accessory rail when moved to the docked position.

16. The wheelchair storage system of claim 15, wherein the autonomously moveable storage unit further comprises one or more hooks configured to latch onto the accessory rail of the wheelchair when the autonomously moveable storage unit is in the docked position.

17. The wheelchair storage system of claim 14, wherein the wheelchair comprises an accessory system communicatively coupled to the processors of the autonomously moveable storage unit, the accessory system comprising:
  an accessory rail; and
  a lifting portion operatively coupled to the accessory rail and configured to lift or lower the accessory rail.

18. The wheelchair storage system of claim 14, wherein the autonomously moveable storage unit is elevated from a surface on which the wheelchair sits when moved to the docked position.

19. The wheelchair storage system of claim 14, wherein:
  the wheelchair comprises a power source; and
  the autonomously moveable storage unit comprises a rechargeable battery, wherein the rechargeable battery of the autonomously moveable storage unit is configured to operatively couple to the power source of the wheelchair when the autonomously moveable storage unit is in the docked position to recharge the rechargeable battery of the autonomously moveable storage unit.

20. The wheelchair storage system of claim 14, wherein the motorized wheelchair base defines a storage space; and
  the autonomously moveable storage unit sits within the storage space of the motorized wheelchair base when in the docked position.

* * * * *

UNITED STATES PATENT AND TRADEMARK OFFICE
CERTIFICATE OF CORRECTION

PATENT NO.         : 10,768,627 B2
APPLICATION NO.    : 16/105483
DATED              : September 8, 2020
INVENTOR(S)        : Douglas A. Moore Page 1 of 1

It is certified that error appears in the above-identified patent and that said Letters Patent is hereby corrected as shown below:

In the Specification

In Column 10, Line(s) 6, delete "tot" and insert --to--, therefor.

Signed and Sealed this
Twenty-seventh Day of October, 2020

Andrei Iancu
*Director of the United States Patent and Trademark Office*